US009814083B2

(12) United States Patent
Ranta-aho et al.

(10) Patent No.: US 9,814,083 B2
(45) Date of Patent: Nov. 7, 2017

(54) METHOD AND APPARATUS FOR ESTABLISHING A CHANNEL

(75) Inventors: Karri Markus Ranta-aho, Espoo (FI); Alexander Sayenko, Espoo (FI); Jing He, Beijing (CN); Isman Bazar, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 451 days.

(21) Appl. No.: 14/369,737

(22) PCT Filed: Dec. 30, 2011

(86) PCT No.: PCT/EP2011/074326
§ 371 (c)(1),
(2), (4) Date: Sep. 16, 2014

(87) PCT Pub. No.: WO2013/097908
PCT Pub. Date: Jul. 4, 2013

(65) Prior Publication Data
US 2015/0016366 A1  Jan. 15, 2015

(51) Int. Cl.
*H04W 4/00* (2009.01)
*H04W 76/02* (2009.01)
(Continued)

(52) U.S. Cl.
CPC ....... *H04W 76/02* (2013.01); *H04W 72/0433* (2013.01); *H04W 74/002* (2013.01); *H04W 28/16* (2013.01)

(58) Field of Classification Search
None
See application file for complete search history.

(56) References Cited

U.S. PATENT DOCUMENTS

| 6,339,713 | B1 * | 1/2002 | Hansson | H04W 52/0225 370/311 |
| 2006/0251030 | A1 * | 11/2006 | Anderson | H04L 47/14 370/338 |

(Continued)

FOREIGN PATENT DOCUMENTS

| CN | 1805564 A | 7/2006 |
| CN | 101855936 A | 10/2010 |

OTHER PUBLICATIONS

3GPP TSG-RAN WG2 Meeting #75, Athens, Greece, Aug. 22-26, 2011, R2-114295, "Considerations on standalone HS-DPCCH in the CELL_FACH state", Nokia Siemens Networks, 3 pgs.

(Continued)

*Primary Examiner* — Shaq Taha
(74) *Attorney, Agent, or Firm* — Harrington & Smith

(57) ABSTRACT

A method includes determining in a network node that a first channel is to be established between an access node and a user equipment. The first channel including one of an uplink or downlink and being provided between said access node and said user equipment. The first channel provides information for controlling a data channel which is the other of said uplink and downlink and provided between said access node and said user equipment. The data channel is such said user equipment is provided with always on connectivity. The method also includes providing information to said access node to cause said first channel to be established responsive to said determination.

15 Claims, 4 Drawing Sheets

(51) Int. Cl.
    *H04W 72/04*     (2009.01)
    *H04W 74/00*     (2009.01)
    *H04W 28/16*     (2009.01)

(56) References Cited

U.S. PATENT DOCUMENTS

| | | | |
|---|---|---|---|
| 2009/0196261 A1 | 8/2009 | Sambhwani et al. | 370/335 |
| 2009/0201871 A1 | 8/2009 | Sambhwani et al. | 370/329 |
| 2010/0157953 A1* | 6/2010 | Christoffersson | H04W 72/1294 370/336 |
| 2012/0120858 A1* | 5/2012 | Das | H04W 52/0229 370/311 |
| 2013/0021971 A1* | 1/2013 | Jain | H04W 76/02 370/328 |
| 2013/0322396 A1* | 12/2013 | Jiang | H04W 16/14 370/329 |

OTHER PUBLICATIONS

3GPP TSG-RAN WG1 Meeting #66bis, Zhuhai, China, 22 Oct. 10-14, 2011, R1-113361, "Standalone HS-DPCCH in Cell-FACH state", InterDigital Communications, LLC, 5 pgs.
3GPP TSG RAN WG2 Meeting #74 R2-112850 Barcelona, ES, May 9-13, 2011; Qualcomm Incorporated; On the benefits of standalone HS-DPCCH in CELL_FACH.
3GPP TSG-RAN WG2 #73b R2-113006 Shanghai, China, Apr. 11-15, 2011; Huawei, HiSilicon; Consideration on HS-DPCCH feedback in CELL_FACH state.
3GPP TSG-RAN WG2 Meeting #74 R2-113294 Barcelona, Spain May 9-May 13, 2011; InterDigital; Considerations on standalone HS-DPCCH in CELL _FACH state.

\* cited by examiner

METHOD AND APPARATUS FOR ESTABLISHING A CHANNEL

Embodiments relate to a method and apparatus and in particular but not exclusively to a method and apparatus for establishing a channel.

A communication system can be seen as a facility that enables communication sessions between two or more entities such as fixed or mobile communication devices, base stations, servers and/or other communication nodes. A communication system and compatible communicating entities typically operate in accordance with a given standard or specification. A communication can be carried on wired or wireless carriers. In a wireless communication system at least a part of the communication between at least two stations occurs over a wireless link.

Examples of wireless systems include public land mobile networks (PLMN) such as cellular networks, satellite based communication systems and different wireless local networks, for example wireless local area networks (WLAN).

A user can access the communication system by means of an appropriate communication device. A communication device of a user is often referred to as user equipment (UE) or terminal. Typically a communication device is used for enabling receiving and transmission of communications such as speech and data. In wireless systems a communication device provides a transceiver that can communicate with another communication device such as e.g. a base station of an access network and/or another user equipment. The communication device may access a carrier provided by a station, for example a base station, and transmit and/or receive communications on the carrier.

An example of communication systems attempting to satisfy the increased demands for capacity is an architecture that is being standardized by the 3rd Generation Partnership Project (3GPP). The communication system is often referred to as Universal Mobile Telecommunications System (UMTS) radio-access technology with the enhancements for High Speed Packet Access (HSPA) which improves the downlink and uplink transmission (HSDPA, HSUPA), and the long-term evolution (LTE) of the Universal Mobile Telecommunications System (UMTS) radio-access technology. The HSPA and LTE enhancements aim to achieve various improvements, for example reduced latency, higher user data rates, improved system capacity and coverage, reduced cost for the operator and so on. A further development of the LTE is often referred to as LTE-Advanced. The various development stages of the 3GPP specifications are referred to as releases.

According to an aspect, there is provided a method comprising: determining in a network node that a first channel is to be established between an access node and a user equipment, said first channel comprising one of an uplink or downlink and being provided between said access node and said user equipment, said first channel providing information for controlling a data channel which is the other of said uplink and downlink and provided between said access node and said user equipment, said data channel being such said user equipment is provided with always on connectivity; and providing information to said access node to cause said first channel to be established responsive to said determination.

Providing information may comprise providing said information with packet data which are to be sent by said access node to said user equipment on said data channel.

Providing information may comprise providing said information with each of said packets.

Providing information may comprise providing said information in a data frame header.

Providing information may comprise providing said information to cause said first channel to be established for an identified user equipment.

The method may comprise receiving status information for at least one user equipment.

The method may comprise causing a request to be sent for status information for at least one user equipment.

The information may comprise information controlling if said first channel is set up before an associated transmission on said data channel.

The information may comprises information controlling if said first channel is set up in parallel with an associated transmission on said data channel. The information may comprise expected amount of data and/or if a corresponding data transmission is expected.

The information may comprise providing time information configured to control the termination of said first channel.

The time information may comprises a timer value indicating a period of time after which the first channel is to be terminated if no transmission occurs within said period of time.

The time information may be provided with said information to cause the first channel to be established.

The method may comprise providing information to said access node, after said first channel is established, said information causing said first channel to be terminated.

The first channel may comprise a dedicated physical control channel.

The first channel may comprise a high speed dedicated physical control channel.

According to an aspect, there is provided a method comprising: determining in a network node that a first channel is to be terminated between an access node and a user equipment, said first channel comprising one of an uplink or downlink and being provided between said access node and said user equipment, said first channel providing information for controlling a data channel which is the other of said uplink and downlink and provided between said access node and said user equipment, said data channel being such said user equipment is provided with always on connectivity; and providing a command to said access node to cause said first channel to be terminated responsive to said determination.

According to an aspect, there is provided a method comprising: receiving at an access node information from an network node indicating that a first channel is to be established, said first channel comprising one of an uplink or downlink and being provided between said access node and said user equipment, said first channel providing information for controlling a data channel which is the other of said uplink and downlink and provided between said access node and said user equipment, said data channel being such said user equipment is provided with always on connectivity; and causing said first channel to be set up between said access node and said user equipment.

According to an aspect, there is provided a method comprising: receiving at an access node a command from an network node indicating that a first channel is to be terminated, said first channel comprising one of an uplink or downlink and being provided between said access node and said user equipment, said first channel providing information for controlling a data channel which is the other of said uplink and downlink and provided between said access node and said user equipment, said data channel being such said user equipment is provided with always on connectivity; and causing said first channel to be terminated.

According to an aspect, there is provided a computer program product comprising computer executable program code which when run on a processor performs any of the methods above.

According to an aspect, there is provided an apparatus configured to perform any of the methods above.

According to an aspect, there is provided an apparatus comprising at least one processor and at least one memory including computer code for one or more programs, the at least one memory and the computer code configured, with the at least one processor, to cause the apparatus at least to: determine in a network node that a first channel is to be established between an access node and a user equipment, said first channel comprising one of an uplink or downlink and being provided between said access node and said user equipment, said first channel providing information for controlling a data channel which is the other of said uplink and downlink and provided between said access node and said user equipment, said data channel being such said user equipment is provided with always on connectivity; and provide information to said access node to cause said first channel to be established responsive to said determination.

The at least one memory and the computer code may be configured, with the at least one processor, to cause the apparatus to provide said information with packet data which are to be sent by said access node to said user equipment on said data channel.

The at least one memory and the computer code may be configured, with the at least one processor, to cause the apparatus to provide said information with each of said packets.

The at least one memory and the computer code may be configured, with the at least one processor, to cause the apparatus to provide said information in a data frame header.

The at least one memory and the computer code may be configured, with the at least one processor, to cause the apparatus to provide said information to cause said first channel to be established for an identified user equipment.

The at least one memory and the computer code may be configured, with the at least one processor, to cause the apparatus to receive status information for at least one user equipment.

The at least one memory and the computer code may be configured, with the at least one processor, to cause the apparatus to cause a request to be sent for status information for at least one user equipment.

The information may comprise information controlling if said first channel is set up before an associated transmission on said data channel.

The information may comprise information controlling if said first channel is set up in parallel with an associated transmission on said data channel.

The information may comprise expected amount of data and/or if a corresponding data transmission is expected.

The at least one memory and the computer code may be configured, with the at least one processor, to cause the apparatus to provide time information configured to control the termination of said first channel.

The time information may comprise a timer value indicating a period of time after which the first channel is to be terminated if no transmission occurs within said period of time.

The time information may be provided with said information to cause the first channel to be established.

The at least one memory and the computer code may be configured, with the at least one processor, to cause the apparatus to provide information to said access node, after said first channel is established, said information causing said first channel to be terminated.

The first channel may comprise a dedicated physical control channel.

The first channel may comprise a high speed dedicated physical control channel.

According to an aspect, there is provided an apparatus comprising at least one processor and at least one memory including computer code for one or more programs, the at least one memory and the computer code configured, with the at least one processor, to cause the apparatus at least to: determine in a network node that a first channel is to be terminated between an access node and a user equipment, said first channel comprising one of an uplink or downlink and being provided between said access node and said user equipment, said first channel providing information for controlling a data channel which is the other of said uplink and downlink and provided between said access node and said user equipment, said data channel being such said user equipment is provided with always on connectivity; and provide a command to said access node to cause said first channel to be terminated responsive to said determination.

According to an aspect, there is provided an apparatus comprising at least one processor and at least one memory including computer code for one or more programs, the at least one memory and the computer code configured, with the at least one processor, to cause the apparatus at least to: receive at an access node information from an network node indicating that a first channel is to be established, said first channel comprising one of an uplink or downlink and being provided between said access node and said user equipment, said first channel providing information for controlling a data channel which is the other of said uplink and downlink and provided between said access node and said user equipment, said data channel being such said user equipment is provided with always on connectivity; and cause said first channel to be set up between said access node and said user equipment.

According to an aspect, there is provided an apparatus comprising at least one processor and at least one memory including computer code for one or more programs, the at least one memory and the computer code configured, with the at least one processor, to cause the apparatus at least to: receive at an access node a command from an network node indicating that a first channel is to be terminated, said first channel comprising one of an uplink or downlink and being provided between said access node and said user equipment, said first channel providing information for controlling a data channel which is the other of said uplink and downlink and provided between said access node and said user equipment, said data channel being such said user equipment is provided with always on connectivity; and cause said first channel to be terminated.

According to an aspect, there is provided a method comprising:

receiving at an access node information from a network node indicating that a user equipment is to move to a faster state or will be receiving further data; and causing information to be sent to the user equipment for causing a release timer to be stopped or restarted.

The information sent to the user equipment comprises indication to stop. The information sent to the user equipment may comprise an empty packet.

According to an aspect, there is provided a method comprising:

determining that a user equipment is to move to a faster state or will be receiving further data: and causing access node information to be sent to an access node indicating that said user equipment is to move to a faster state or will be receiving further data.

Embodiments will now be described, by way of example only, with reference to the following examples and accompanying drawings, in which.

Figure 4A:
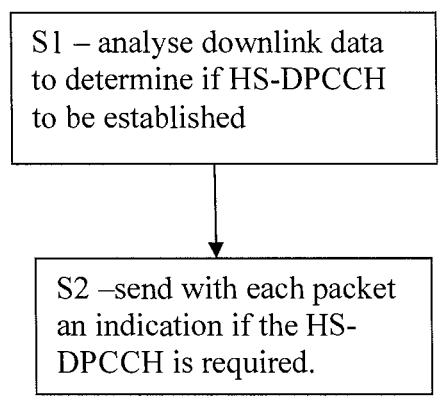
Figure 5:
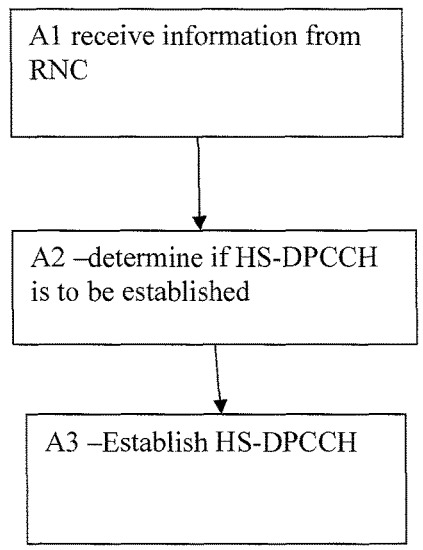

FIGS. 4a and b show methods of embodiments, performed in a radio network controller;

FIG. 5 shows a method performed in a base station or Node B; and

Figure 6:
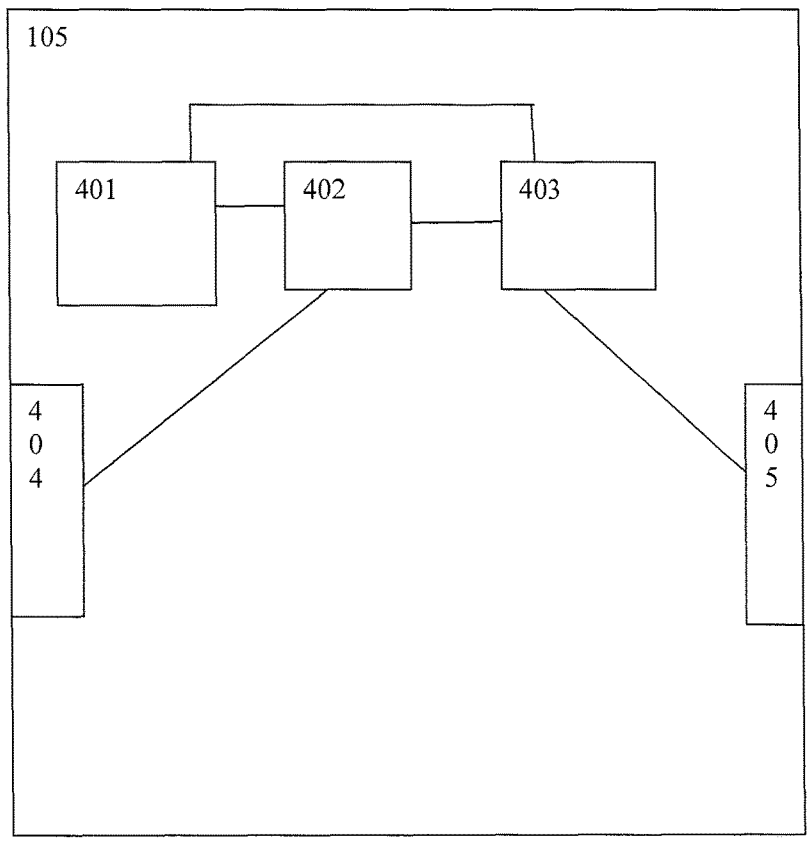

FIG. 6 shows a schematic diagram of a Node B or base station.

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 and 6 to assist in understanding the technology underlying the described examples.

Figure 1:
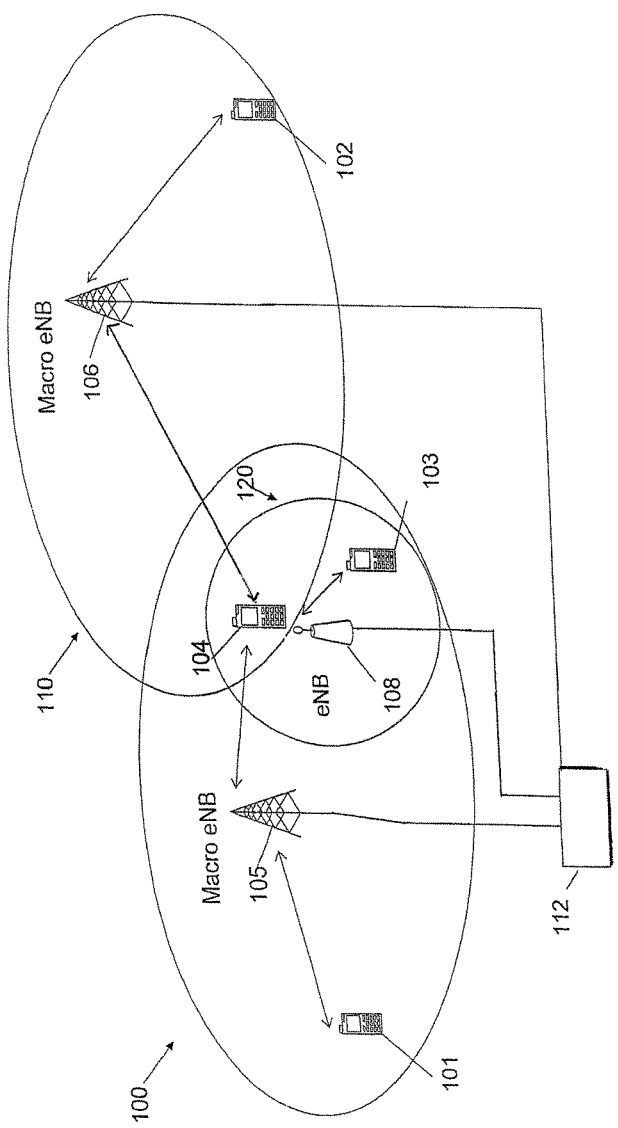
FIG. 1 shows a schematic diagram of a network according to some embodiments.

A mobile communication device or user equipment 101, 102, 103, 104 is typically provided wireless access via at least one base station or similar wireless transmitter and/or receiver node of an access system. In FIG. 1 three neighbouring and overlapping access systems or radio service areas 100, 110 and 120 are shown being provided by base stations 105, 106, and 108.

However, it is noted that instead of three access systems, any number of access systems can be provided in a communication system. An access system can be provided by a cell of a cellular system or another system enabling a communication device to access a communication system. A base station site 105, 106, 108 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each mobile communication device 101, 102, 103, 104, and base station 105, 106, and 108 may have one or more radio channels open at the same time and may send signals to and/or receive signals from more than one source.

Base stations 105, 106, 108 may be controlled by a radio network controller RNC 112 so as to enable operation thereof and management of mobile communication devices 101, 102, 103, 104 in communication with the base stations 105, 106, 108.

The cell borders or edges are schematically shown for illustration purposes only in FIG. 1. It shall be understood that the sizes and shapes of the cells or other radio service areas may vary considerably from the similarly sized omnidirectional shapes of FIG. 1.

In particular, FIG. 1 depicts two wide area base stations 105, 106, which can be macro-NBs (node B) 105, 106. The macro-NBs 105, 106 transmit and receive data over the entire coverage of the cells 100 and 110 respectively. FIG. 1 also shows a smaller base station or access point which in some embodiments can be a pico NB 108. The coverage of the smaller base station 108 may generally be smaller than the coverage of the wide area base stations 105, 106. The coverage provided by the smaller node 108 overlaps with the coverage provided by the macro-NBs 105, 106. In some embodiments, the smaller node can be a femto or Home NB. Pico NBs can be used to extend coverage of the macro-NBs 105, 106 outside the original cell coverage 100, 110 of the macro-NBs 105, 106. The pico NB can also be used to provide cell coverage in "gaps" or "shadows" where there is no coverage within the existing cells 100, 110 and/or may serve "hot spots".

It should be noted that in some embodiments the pico NB or smaller NBs may not be present. In alternative embodiments, only pico or smaller NBs may be present. In some embodiments there may be no macro NBs.

The communication devices 101, 102, 103, 104 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

Some non-limiting examples of the recent developments in communication systems are the High Speed Packet Access (HSPA) for uplink and downlink transmission or long-term evolution (LTE) of the Universal Mobile Telecommunications System (UMTS) that is being standardized by the 3rd Generation Partnership Project (3GPP). As explained above, further development of the LTE is referred to as LTE-Advanced.

Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

Although not shown in FIG. 1, a base station may provide a plurality of cells.

Figure 2:
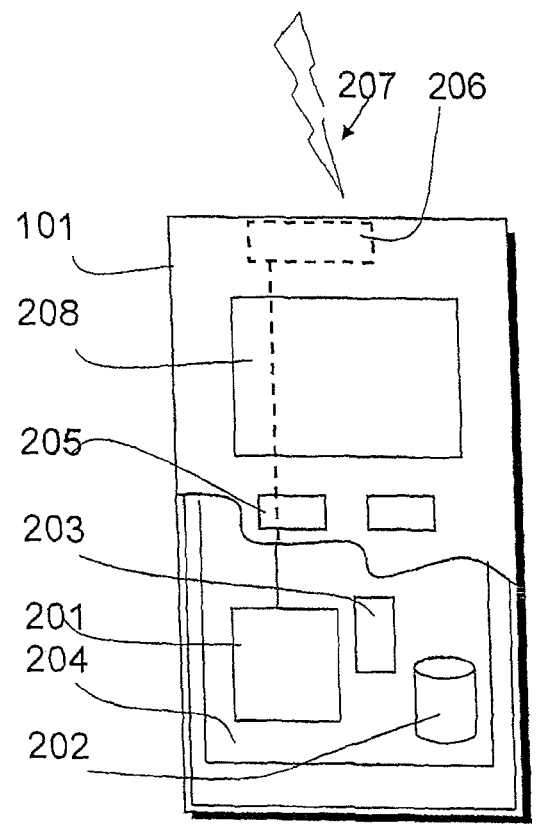
FIG. 2 shows a schematic diagram of a mobile communication device according to some embodiments.

The communication devices will now be described in more detail in reference to FIG. 2. FIG. 2 shows a schematic, partially sectioned view of a communication device 101 that a user can use for communication. The communication device may be a mobile communication device. A communication device is often referred to as user equipment (UE) or terminal. An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. A user may also be provided broadcast or multicast data. Non-limiting examples of the content include downloads, television and radio programs, videos, advertisements, various alerts and other information.

The user equipment 101 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

The user equipment is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the user equipment by means of a suitable user interface such as a key pad 205, voice commands, touch sensitive screen or pad, combinations thereof or the like. A display 208, a speaker and a microphone can be also provided. Furthermore, a user equipment may comprise appropriate connectors (either wired or wireless) to other devices and/or for connecting external accessories, for example hands-free equipment, thereto.

Figure 3:
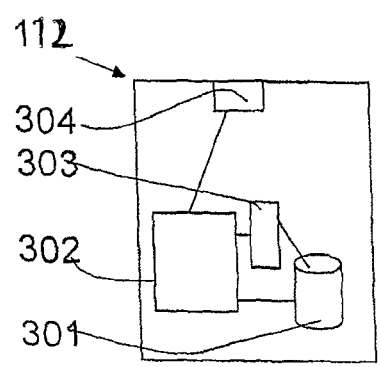
FIG. 3 shows a schematic diagram of a radio network controller according to some embodiments.

FIG. 3 shows an example of the RNC 112. The RNC 112 comprises at least one memory 301, at least one data processing unit 302, 303 and an input/output interface 304. Via the interface the RNC can be coupled a plurality of base stations.

Reference is made to FIG. 6 which shows a base station 105. The base station comprises at least one memory 401 and at least one data processing unit 402 and 403. The base station is provided with a first interface 404 for interfacing with the RNC. The base station is provided with a second interface 405 which is a wireless interface for interfacing with user equipment.

Recent trends in the wireless applications and mobile phone usage have always-on presence where a user equipment keeps a continual data connection with the wireless network. To cater for the trade-off between on the one hand performance and on the other hand the user equipment battery life, the standardisation body 3GPP has approved a work item related to CELL_FACH (forward access channel). In the CELL_FACH state, there may be no dedicated physical channel is allocated to the UE. The UE may continuously monitor a FACH in the downlink. The UE may be assigned a default common or shared transport channel in the uplink (e.g. RACH—random access channel) that can be used by the UE. One of the proposals is a standalone uplink feedback channel that can enhance the downlink performance when no uplink transmission occurs.

Some embodiments may allow the RNC to control when and how the standalone uplink feedback channel is established between a Node B and a UE.

A UE which can operate in conjunction with HSPA may a have a plurality of states, in which the UE can exchange data with the wireless network (via the Node B). One state is a CELL_DCH (dedicated channel) which is used when for example a large amount of data is to be transferred. In the CELL_DCH state a dedicated physical channel may be allocated to the UE in both the uplink and downlink directions.

Another state is CELL_FACH (FACH) as discussed previously which may be used for much smaller volumes of transmitted data. One advantage of CELL_FACH over CELL_DCH is that the former does not require continuous uplink transmission of pilots and channel state information, which makes the CELL_FACH state more battery efficient. However, an absence of the uplink feedback may limit the downlink performance. Currently the only case when the uplink feedback channel is established in the CELL_FACH state is when the uplink data transmission takes place.

It has been proposed to provide a standalone uplink feedback channel for CELL_FACH, hence referred to as HS-DPCCH (high speed dedicated physical control channel). One motivation is that data transmission in downlink and uplink may happen at different times, thus requiring the HS-DPCCH channel when no actual uplink transmission takes place.

Some proposals for the automatic channel establishment whenever the downlink transmission starts may result in a worse performance because even a small amount of downlink data may trigger unnecessarily the HS-DPCCH channel. Some embodiments may provide a more flexible approach for the establishment of the HS-DPCCH. Some embodiments provide information to the Node B as to when and upon which conditions the HS-DPCCH channel should be established. In some embodiments, the information is provided by the RNC to the Node B. As the RNC has an overview of the application level traffic and its characteristics, the RNC is thus able to provide this information to the Node B.

Additionally or alternatively, some embodiments control the termination of the HS-DPCCH. It may be undesirable to keep this channel all the time as this may result in higher battery consumption. Thus, this channel should be terminated at some point. Due to burstiness of at least some traffic sent in the CELL_FACH state, the Node B is provided with additional information which is used to control when the feedback channel is removed. If the HS-DPCCH is terminated when a downlink transmissions ends, it may result in unnecessary delays if another downlink bursts arrives soon after the previous burst or if the UE initiates an uplink transmission. It should be appreciated that keeping the HS-DPCCH channel may result in a higher UE battery consumption.

It should be appreciated that in some embodiments, the actual signaling to establish/terminate the HS-DPCCH channel is be exchanged between Node B and a UE to ensure the fast control. In some embodiments, the top level decision on whether the HS-DPCCH channel is needed is done by the RNC. The RNC knows what kind of traffic a particular UE has and can make a decision on whether the HS-DPCCH channel is needed and when that should be terminated. If the amount of incoming traffic exceeds some threshold, then RNC can make a decision to move a UE to the CELL_DCH state. Making RNC the central control point in some embodiments may have an advantage that a number of RRM (radio resource management) related actions may happen within the same place which simplifies software upgrades and the introduction of further updates.

Some embodiments use signaling between the RNC and Node B, so that the Node B understands when it makes sense to establish and terminate the HS-DPCCH channel.

Reference is now made to FIGS. 4a and b which show a method for controlling when to establish the HS-DPCCH channel.

A first method is now described in relation to FIG. 4a.

In step S1 the RNC determines if an HS-DPCCH should be established. The RNC may analyze the downlink data for a particular UE to determine if the HS-DPCCH should be established. There may be one or more pieces of information which may be used by the RNC in making a decision as to whether or not the whether the standalone HS-DPCCH should be established. The information may be direct information and/or indirect information. For example, one piece of information which may be used is the amount of data coming in the downlink direction. If the amount of data exceeds a threshold, then an early presence or establishment of the HS-DPCCH feedback channel may benefit that large burst of data. Additionally or alternatively, some knowledge of the traffic profile and/or deep packet inspection may help in deciding that a particular data flow needs a smaller response time and thus should be transmitted as soon as possible. Alternatively or additionally a QoS parameters associated the traffic may be used if available. In step S2, if the HS-DPCCH is to be established, the RNC will send an explicit indication in the Iub protocol for every downlink packet sent to Node B. In some embodiments, each packet that requires a HS-DPCCH will include information to that effect. In alternative embodiments, the information provided will indicate that an HS-DPCCH is to be established. This information may not be included in subsequent packets.

In some embodiments, the RNC will have knowledge as to whether the HS-DPCCH has been established or not. Accordingly, the RNC may only signal that a HS-DPCCH is to be set up if a HS-DPCCH has not been set up and is required. In other embodiments, the RNC will send with each packet information as to whether the HS-DPCCH is required, regardless of whether or not the HS-DPCCH has been established or not. This may be regardless of whether or not the RNC knows if the HS-DPCCH has been established.

Figure 4B:
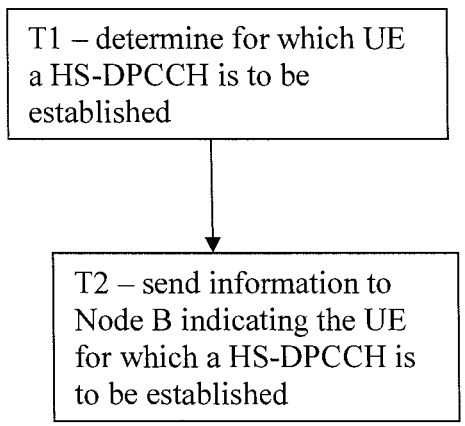

A second method is now described in relation to FIG. 4b.

In step T1, the RNC will determine for which one or more UEs a HS-DPCCH is to be established. This may use information such as mentioned in relation to step S1.

In step T2, a control message may be sent to the Node B indicating a need for the HS-DPCCH channel for a particular UE. In some embodiments, this indication may only need to be sent once. In some embodiments, the RNC will perform this analysis at regular intervals and send the information based on this analysis at regular intervals.

Again the RNC may or may not have knowledge as to whether or not a HS-DPCCH has been established or not. If the RNC does not have knowledge, an indication as to whether or not a HS-DPCCH is required for a particular UE may be sent from time to time. Where the RNC does have knowledge, the indication may only be sent when the UE needs a HS-DPCCH and no HS-DPCCH is established.

In one modification which may be used with either or the methods described in relation to FIGS. 4a and b, the RNC may provide information to the Node B which indicates if the HS-DPCCH is to be set up in parallel with the down link transmission. Alternatively or additionally the information may indicate that the HS-DPCCH may be set up before the down link transmission. In some embodiments, one or other of these modes may be the default mode of operation. In some embodiments, only one or these two options may be available.

In one modification which can be made to either of the embodiments of FIG. 4, the RNC may provide additional information to the Node B. This may be provided for example in step S2 or T2 or may be separately provided. This information may be additional or alternative to the information provided in steps T2 and S2.

This additional information may be provided to enable the Node B to decide if the HS-DPCCH channel should be set up or not. This information would help the Node B to weigh the uplink receiver resource situation against the expected benefit of HS-DPCCH for a particular radio link. The information may comprise one or more of the expected amount of DL (downlink) data, whether or not the uplink data transmission is expected to immediately follow the downlink transmission and setting up the uplink connection in advance would be helpful. Any other suitable information may alternatively or additionally be provided.

Reference will now be made to FIG. 5 which shows the method of the Node B.

In step A1, the Node B receives information from the RNC. This information may comprise any one or more of the different information mentioned previously.

In step A2, the Node B determines if an HS-DPCCH is to be established. Optionally this may comprise determining if the HS-DPCCH is already established. This determining if the HS-DPCCH is to be established may be based on one or more of if the downlink data has an HS-DPCCH, if information indicates a UE for which a HS-DPCCH is to be established and additional information relating to the benefit of establishing a HS-DPCCH. The information provided by the RNC may effectively be a command which controls the Node B to establish the HS-DPCCH. Alternatively, the information provided by the RNC may allow the Node B to make the decision as to whether the HS-DPCCH is to be established. Alternatively, the RNC may provide a command to establish the HS-DPCCH and additional information. The Node B will decide whether to follow the command in dependence on the additional information. Alternatively or additionally, the Node B may use information available to it locally.

In Step A3, the Node B will establish the HS-DPCCH. In some embodiments whenever the downlink transmission takes place towards a particular UE, the Node B will establish the HS-DPCCH channel if it is not present yet. If the HS-DPCCH is not established yet, then it should be set up to facilitate the downlink transmission. Such an approach allows the RNC to control the HS-DPCCH establishment on the burst-by-burst basis.

As mentioned previously the RNC can:
a. Instruct the establishment of the HS-DPCCH channel in parallel to the first downlink transmission; and/or
b. Instruct that the downlink transmission must take place only after the HS-DPCCH channel is established.

Alternatively the Node B can decide to
a. Establish of the HS-DPCCH channel in parallel to the first downlink transmission; and/or
b. Cause the downlink transmission take only place only after the HS-DPCCH channel is established.

The information defining the ordering of the set up of the HS-DPCCH with respect to the downlink transmission may be part of the information received from the RNC in step A1.

In some embodiments, only one of these options may be available to the Node B and/or RNC.

Alternatively or additionally, the information provided by the RNC in step A1 could provide the information to enable the Node B to decide if the HS-DPCCH channel should be set up or not. This would help the Node B to weigh the uplink receiver resource situation against the expected benefit of HS-DPCCH for this particular radio link. This information may be as described above.

In one embodiment, the Node B can send a status report for a particular UE either based on autonomous procedure or triggered by such a request from the RNC. Based on this status report, the RNC may determine if a HS-DPCCH is required to be established.

When the HS-DPCCH channel is to be terminated, the RNC can send an explicit message to the Node B indicating that the HS-DPCCH channel should be terminated. The RNC may determine that the HS-DPCCH channel should be terminated in dependence on one or more of the same types of information as mentioned previously in relation to for example step S1. For example, if the RNC knows or can predict the traffic profile, then the RNC can signal when the HS-DPCCH channel is not needed and can be terminated.

Alternatively or additionally, the RNC may send information to the Node B indicating under what circumstances the Node B should terminate or remove the HS-DPCCH. For example that information may be sent with the information which causes the HS-DPCCH to be established. That information may comprise a timer value that will indicate when the HS-DPCCH channel should be removed if no transmission occurs within the specified period of time.

Where the RNC controls the presence of the HS-DPCCH channel by the explicit packet-by-packet indication in every message sent to the Node B, this indication may be carried in the Iub frame protocol data frame header from the RNC to the Node B together with the payload to be sent to the UE. Once the indication is set for the first time, the Node B may establish the HS-DPCCH channel for the UE the payload was intended to, and take no actions if the HS-DPCCH is already present for that UE. When the RNC decides that the HS-DPCCH is not needed, this indication is reset, which triggers automatically an HS-DPCCH removal after all the data in the buffer has been sent, unless the uplink traffic situation requires maintaining the uplink connection for longer. This resetting of the indication may be used to indicate to the Node B that no more DL data is to be expected and the UL can be dropped as soon as the over-the-air transactions are completed. In some embodiments, a timer in the node B can be set, upon expiry of which the HS-DPCCH is removed by Node B. This approach with the packet-by-packet indication has an advantage of finer control by the RNC over the HS-DPCCH channel.

Consider the case where the RNC makes a decision that the standalone HS-DPCCH is needed for a particular UE. With regards to the HS-DPCCH establishment status, the Node B may send a status report for a particular UE either based on an autonomous procedure or triggered by such a request from RNC. If so, the RNC may send only once a control message to Node B (either as an NBAP (node B application part) message or in a frame protocol frame) indicating a need for HS-DPCCH. The Node B may establish automatically HS-DPCCH whenever the downlink transmission occurs. The HS-DPCCH may be terminated either by an explicit message from RNC or based on expiry of the traffic inactivity timer. An advantage of this approach may be that the amount of control signaling between RNC and Node B is reduced because there is no need to include an explicit indication in every transmitted packet.

In some embodiments, since the HS-DPCCH establishment may take some time, one option as discussed above is to start the downlink transmission without having the HS-DPCCH channel. This may save some time, but first downlink transmissions may be blind and will not have any HARQ feedback. Another option, again as mentioned previously, is to wait for the establishment of HS-DPCCH channel and once Node B has CQIs (channel quality indicators) from the UE, the Node B can start the actual downlink transmission. This may introduce some delay, but all the downlink transmissions will be based on actual channel performance and will have HARQ feedback.

In some embodiments, the particular strategy which is selected may depend on the actual traffic characteristics and the cell loading situation. The RNC may provide information to the Node B indicating whether it is necessary to wait for the HS-DPCCH establishment before transmitting in downlink or not.

The RNC may optionally signal a UE specific E-DCH (enhanced dedicated channel) or other dedicated channel release timer, which will indicate that after some period of inactivity a UE should release its E-DCH resources in the FACH state. This may provide granular control on a per-UE basis.

In some arrangements an E-DCH release timer may release automatically the UE UL resources in the FACH state. This may not require the NodeB to send an explicit termination indication to the UE. There might be a large burst of data which is received by the RNC, thus triggering a decision to move a UE to the faster DCH state. By the time this decision reaches a UE in form of the RRC (radio resource control) message, the latter may have released its E-DCH resources, if any. If a UE has the E-DCH resources, then the transition to the faster state may be fulfilled relatively quickly, for example within 100 ms; otherwise, it may take a relatively long time.

Thus, in one modification, the RNC is configured to send an indication or command to the NodeB. The NodeB in turn can advise a UE that the E-DCH release timer should be stopped. This indication may be an explicit Iub indication and L1 indication (e.g., an HS-SCCH order). Alternatively or additionally the NodeB just schedules empty packets to a UE if the former receives a RL (radio link) reconfiguration message from RNC that a UE should move to the DCH state. The empty packets mean that the timer may be reset if the timer is counting down a period of inactivity.

In the above described embodiments, the establishment of the HS-DPCCH has been described. However it should be appreciated that other embodiments may be used with one or more other channels. These other channels may be in the context of the 3GPP standardization or in the context of a different standard or protocol. Some embodiments may be applied where there is no continuous transmission of channel information in one of uplink and downlink and there is a transmission in the other of the uplink and downlink which uses channel information from the one of the uplink and downlink.

In alternative embodiments, a channel which is used to provide channel feedback may be provided. The channel feedback may comprise channel quality information and/or HARQ feedback.

In the above, the establishment and termination of the uplink channel has been described. Alternatively or additionally embodiments may also be applied to the establishment and termination of a downlink channel. This downlink channel may be downlink dedicated resources.

In the described embodiments, reference has been made to a Node B. It should be appreciated that alternative embodiments may use any other suitable wireless access node, for example a base station or the like.

In the described embodiments, reference has been made to a radio network controller. It should be appreciated that alternative embodiments may use any other suitable network controller which controls a wireless access node.

Various different embodiments have been described. It should be appreciated that one or more embodiments may be used at least partially in combination.

Various different methods have been shown. It should be appreciated that in some embodiments one or more of the method steps may be combined into a single step. In some embodiments, one or more of the method steps may be changed in terms of order. In some embodiments, one or more steps may be omitted. In some embodiments, one or more additional steps may be included. Parts of one method may be used with parts of another method.

One or more of the steps of any of the methods may be implemented using a respective arrangement. The respective arrangement may comprise circuitry and/or may be performed by one or more processors run computer code. One or more arrangements may be provided by common circuitry and/or the same one or more processors as used by another arrangement. Where one or more processors are provided, these processors may operate in conjunction with one or more memories.

The required data processing apparatus and functions of a base station apparatus, and RNC may be provided by means of one or more data processors. These may perform one or more of the method steps of a respective method.

The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip.

Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of embodiments may be implemented in hardware, while other aspects may be implemented in firmware or software which may be executed by a controller, microprocessor or other computing device, although embodiments are not limited thereto. While various aspects of the embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by one or more data processors in conjunction with one or more memories of a base station, or RNC.

One or more steps of a method of an embodiment may be performed when computer executable instructions are run on one or more processors.

Further in this regard it should be noted that any blocks of the logic flow as in the Figures may represent program steps, or interconnected logic circuits, blocks and functions, or a combination of program steps and logic circuits, blocks and functions.

The software or computer executable instructions may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
determining, in a radio network controller, that a first channel is to be established between a base station and a user equipment, said first channel comprising an uplink channel, said first channel providing information for controlling a downlink data channel between said base station and said user equipment, said data channel being such that said user equipment is provided with always on connectivity; and
providing, by the radio network controller,
information to said base station to cause said first channel to be established responsive to said determination, and
time information configured to control the termination of said first channel, wherein the time information comprises a timer value indicating a period of time after which the first channel is to be terminated if no transmission occurs within said period of time.

2. The method of claim 1, wherein providing information comprises providing said information with packet data which are to be sent by said base station to said user equipment on said data channel.

3. The method of claim 2, wherein providing information comprises providing said information with each of said packets.

4. The method of claim 1, wherein said providing information comprises providing said information to cause said first channel to be established for an identified user equipment.

5. The method of claim 1, wherein said information comprises information controlling if said first channel is set up before an associated transmission on said data channel or if said first channel is set up in parallel with an associated transmission on said data channel.

6. The method of claim 1, wherein said information comprises expected amount of data and/or if a corresponding data transmission is expected.

7. The method of claim 1, comprising providing termination information configured to control the termination of said first channel.

8. A method comprising:
  determining, in a radio network controller, that a first channel is to be terminated between a base station and a user equipment, said first channel comprising an uplink channel, said first channel providing information for controlling a downlink data channel provided between said base station and said user equipment, said data channel being such said user equipment is provided with always on connectivity, wherein the determining comprises using time information configured to control the termination of said first channel, wherein the time information comprises a timer value indicating a period of time after which the first channel is to be terminated if no transmission occurs within said period of time; and
  providing, by the radio network controller, a command to said base station to cause said first channel to be terminated responsive to said determination.

9. A method comprising:
  receiving at a base station from a radio network controller
    information indicating that a first channel is to be established, said first channel comprising an uplink channel said first channel providing information for controlling a downlink data channel provided between said base station and said user equipment, said data channel being such said user equipment is provided with always on connectivity, and
    time information configured to control the termination of said first channel, wherein the time information comprises a timer value indicating a period of time after which the first channel is to be terminated if no transmission occurs within said period of time; and
  causing said first channel to be set up between said base station and said user equipment.

10. A method comprising:
  receiving at a base station a command from a radio network controller indicating that a first channel is to be terminated, said first channel comprising an uplink channel, said first channel providing information for controlling a downlink data channel provided between said base station and said user equipment, said data channel being such said user equipment is provided with always on connectivity, the command further indicating time information configured to control the termination of said first channel, wherein the time information comprises a timer value indicating a period of time after which the first channel is to be terminated if no transmission occurs within said period of time; and
  causing said first channel to be terminated.

11. A computer program product comprising computer executable program code which when run on a processor performs the method claim 1.

12. An apparatus comprising at least one processor and at least one memory including computer code for one or more programs, the at least one memory and the computer code configured, with the at least one processor, to cause the apparatus at least to:
  determine in a radio network controller that a first channel is to be established between a base station and a user equipment, said first channel comprising an uplink channel, said first channel providing information for controlling a downlink data channel provided between said access node and said user equipment, said data channel being such said user equipment is provided with always on connectivity; and
  provide
    information to said base station to cause said first channel to be established responsive to said determination, and
    time information configured to control the termination of said first channel, wherein the time information comprises a timer value indicating a period of time after which the first channel is to be terminated if no transmission occurs within said period of time.

13. An apparatus comprising at least one processor and at least one memory including computer code for one or more programs, the at least one memory and the computer code configured, with the at least one processor, to cause the apparatus at least to:
  determine in a radio network controller that a first channel is to be terminated between a base station and a user equipment, said first channel comprising an uplink channel, said first channel providing information for controlling a downlink data channel provided between said base station and said user equipment, said data channel being such said user equipment is provided with always on connectivity, wherein the determination comprises using time information configured to control the termination of said first channel, wherein the time information comprises a timer value indicating a period of time after which the first channel is to be terminated if no transmission occurs within said period of time; and
  provide a command to said base station to cause said first channel to be terminated responsive to said determination.

14. An apparatus comprising at least one processor and at least one memory including computer code for one or more programs, the at least one memory and the computer code configured, with the at least one processor, to cause the apparatus at least to:
  receive at a base station from a network controller
    information indicating that a first channel is to be established, said first channel comprising an uplink channel being provided between said base station and said user equipment, said first channel providing information for controlling a downlink data channel being provided between said base station and said user equipment, said data channel being such said user equipment is provided with always on connectivity, and
    time information configured to control the termination of said first channel, wherein the time information comprises a timer value indicating a period of time after which the first channel is to be terminated if no transmission occurs within said period of time; and
  cause said first channel to be set up between said base station and said user equipment.

15. An apparatus comprising at least one processor and at least one memory including computer code for one or more programs, the at least one memory and the computer code configured, with the at least one processor, to cause the apparatus at least to:
  receive at a base station a command from a radio network controller indicating that a first channel is to be terminated, said first channel comprising an uplink channel and being provided between said base station and said user equipment, said first channel providing information for controlling a downlink data channel being provided between said base station and said user equipment, said data channel being such that said user equipment is provided with always on connectivity, the command further indicating time information configured to control the termination of said first channel, wherein the time information comprises a timer value indicating a period of time after which the first channel is to be terminated if no transmission occurs within said period of time; and
causing said first channel to be terminated.

* * * * *